United States Patent Office 3,078,283
Patented Feb. 19, 1963

3,078,283
PROCESS FOR PREPARING TETRAALKYL
SUBSTITUTED BENZOQUINONES
Allan S. Hay, Schenectady, N.Y., assignor to General
Electric Company, a corporation of New York
No Drawing. Filed Feb. 28, 1961, Ser. No. 92,177
6 Claims. (Cl. 260—396)

This invention is concerned with a process for preparing tetraalkyl quinones. More particularly, the invention relates to a process for preparing tetraalkyl quinones by subjecting a tetraalkyl diaminobenzene (which is a precursor of the quinone) to treatment with oxygen (or air) in the presence of a tertiary amine and a cuprous salt capable of existing in the cupric state.

The invention generically encompasses converting tetraalkyl diaminobenzenes corresponding to the general formula

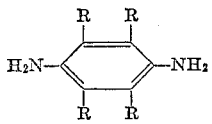

I where R is a lower alkyl radical having from 1 to 4 carbon atoms (e.g., methyl, ethyl, propyl, isopropyl, butyl, isobutyl) to the corresponding quinone. Among the compositions which can generically be prepared by my process are those having the general formula

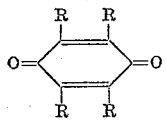

where R has the meaning given above, the said composition being derived from oxidation of a starting material having Formula I above, which is converted to the quinone through what is believed to be the intermediate compound having the formula

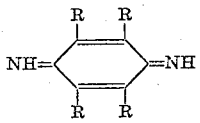

where R has the meaning given above. Specifically, and for illustrative purposes, the description which follows will be concerned with a discussion of the preparation of duroquinone having the formula

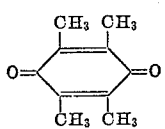

derived from the oxidation of durenediamine having the formula

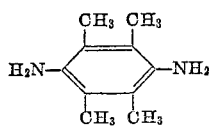

Many attempts have been made in the past for preparing quinone structures of Formula I and particularly the preparation of duroquinone from durenediamine. These processes have in general required strong oxidation conditions or exotic starting materials. Thus, as shown in U.S. Patent 2,373,003, durene has been oxidized with 30% hydrogen peroxide in acetic acid to give about a 40% yield of duroquinone. In U.S. Patent 2,446,856, duroquinone is prepared by the oxidation of the diazo derivative of durenol by means of iron chloride or manganese oxide; however, the conditions are somewhat severe and the yield is not particularly good. Finally, in the book "Organic Syntheses" Coll. vol. III, edited by H. Blatt, published by John Wiley and Sons (1943), page 254, there is shown the oxidation of durenediamine, but in order to obtain the product, excessively large amounts of ferric chloride are needed, e.g., 300 parts ferric chloride to make 40 parts duroquinone.

Unexpectedly, I have discovered that I am able to make quinones from tetraalkyl diaminobenzenes by a process which readily adapts itself to commercial operation because of the ease and speed of preparation and by means of this proces, it is possible to obtain the quinones in especially good yields. More particularly, I am able to obtain quinones containing four alkyl groups by subjecting a diaminotetraalkyl benzene to treatment with oxygen (which by reference and for brevity is intended to include air) in the presence of a catalytic system comprising a tertiary amine and a cuprous salt which is capable of existing in the cupric state.

The diaminotetraalkyl benzenes which can be used as starting materials include, for instance, 1,4-diaminotetramethyl benzene, 1,4-diaminotetraethyl benzene, 1,4-diaminotetrapropyl benzene, 1,4-diaminodimethyldiethyl benzene (including the various isomers), etc.

In providing the catalyst comprising the cuprous salt and tertiary amine, the particular cuprous salt used has little if any effect on the product obtained. The only requirement is that the cuprous salt must be capable of existing in the cupric state and must be capable of forming a complex with the tertiary amine that is soluble in the reaction medium, which can be, e.g., a suitable solvent, excess amine, or excess of the starting diaminotetraalkyl benzene compound (which for brevity is herewith referred to as the "diamino compound"), if it is suitable as a solvent. The necessity for being able to exist in the cupric state is based on the belief that the oxidation of the above described diamino compound reaction is accomplished by an intermediate formation of an activated cupric amine complex that reacts with the diamino compound to regenerate the cuprous amine complex. As far as can be determined, it is impossible to form this activated complex by starting originally with a cupric salt in making the copper amine complex unless reducing conditions are present to form the cuprous salt in situ. Suitable cuprous salts include cuprous chloride, cuprous bromide, cuprous sulfate, cuprous azide, cuprous tetraamine sulfate, cuprous acetate, cuprous propionate, cuprous palmitate, cuprous benzoate, etc. Cuprous salts such as cuprous iodide, cuprous sulfide, cuprous cyanide, cuprous thiocyanate, etc., are not suitable for use in my process because their complexes with the amines are either not soluble in the reaction medium or else are not capable of existing as stable cupric salts.

Examples of tertiary amines which may be used in practicing my invention are the acyclic aliphatic tertiary amines free of ring-bonded nitrogen, such as trimethylamine, triethylamine, tripropylamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl) bromobenzylamine, 1 - dimethylamino-2-phenylpropane, 1-dimethylamino-4-pentane, etc. When aliphatic tertiary amines are used, it is preferred that at least two of the aliphatic groups be straight chain hydrocarbon groups.

Examples of cyclic amines in which the nitrogen atom is part of the ring structure are the pyridines, such as pyridine itself, quinuclidine, the dipyridyls, the N-alkyl pyrroles, the N-alkyl pyrrolidines, the N-alkyl piperidines, the N-alkyl diazoles and triazoles, the quinolines, the diazines and triazines, the isoquinolines, the diquinoyls, the N-alkyl tetrahydroquinolines, the N-alkyl tetrahydroisoquinolines, the phenathrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc.), alkoxy (for example, methoxy, ethoxy, propoxy, butoxy, phenoxy, etc.), aryl (for example, phenyl, tolyl, dimethylphenyl, chlorophenyl, bromotolyl, naphthyl, chlorobromonaphthyl, etc.), aryloxy (for example, phenoxy, toloxy, xyloxy, chlorophenoxy, naphthoxy, etc.), and the like. Isomers and homologues of these compounds are not precluded. The ring substituents may be the same or different hydrocarbon groups. It is understood that when piperidines, pyrroles, pyrrolidines, diazoles, tetrahydroquinolines, and tetrahydroisoquinolines are used, they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl piperidine, N-methylimidazole, N-methyl-1,2,4-triazole, N-isopropylpyrrolidine, etc.

By the term "a pyridine" I means these aromatic organic compounds having a 6-member aromatic ring, 5 of the members being carbon and 1 being nitrogen. Pyridine itself, β-collidine, β- and γ-picoline, 3,4-litidine, α and γ-collidine, α-picoline, the 2,4-, 2,5- and 2,6-lutidines, etc., are conveniently available pyridines to use.

In general, tertiary polyamines behave in the same way as tertiary monoamines in my reaction, except of course, the amount used would only have to be that amount necessary to give the equivalent amount of amino groups. Typical examples of aliphatic tertiary polyamines are the N,N,N',N'-tetraalkylethylenediamines, the N,N,N',N'-tetraalkylpropanediamines, the N,N,N',N'-tetraalkylbutanediamines, the N,N,N',N'-tetraalkylpentanediamines, the N,N',N',N'',N''-pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. Preferred are those tertiary polyamines which have only two or three aliphatic or cycloaliphatic carbon atoms separating the two tertiary amino nitrogens. For example, such polyamines give catalysts of enhanced activity and allow the reaction to be run in a shorter time than could be used with the aliphatic tertiary monoamines.

Typical examples of these tertiary polyamines are, for example: N,N,N',N'-tetramethylethylenediamine; N-ethyl-N,N',N'-trimethylethylenediamine; N-methyl-N,N',N'-triethylethylenediamine; N,N,N',N' - tetramethyl-1,3-propanediamine; N,N,N',N'-tetraethylethylenediamine; N,N-dimethyl - N'N' - diethylethylenediamine; 1,2-bis(2-methylpiperidino) - ethane; N,N,N',N' - tetra-n-hexyethylenediamine; N,N,N',N' - tetra-n-amylethylenediamine; 1,2-bispiperidinoethane; N,N,N',N' - tetraisobutylethylenediamine; N,N,N',N' - tetramethyl-1,3-butanediamine; 1,2-bis(2,6-dimethylpiperidino)ethane; N,N-didecyl-N',N'-dimethylethylenediamine; N-methyl, N',N',N'',N''-tetraethyldiethylenetriamine; N-decyl-N,N',N'-triethylethylenediamine; 2-(β-piperidinoethyl)pyridine; 2-(β-dimethylaminoethyl)-6-methylpyridine; 2-(β-dimethylaminoethyl-pyridine; and 2-(β-morpholinoethyl)pyridine, etc.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer not to use tertiary amines having an N-aryl substituent.

Although I do not want to be bound by my theory, I believe that one mol of cuprous salt forms a complex with two mols of the monoamine or one mol of a diamine. This complex can react with oxygen to form an oxidized intermediate which can form a complex with the diamino compound and cause the reaction to proceed.

Although mixtures of tertiary amines and mixtures of cuprous salts may be used, no particular benefit is believed to accrue from such use. Preferably, the cuprous salt is combined with the tertiary amine and the complex thus formed is dissolved in a suitable solvent before the diamino compound is added. Excesses of the tertiary amine can be used as the solvent medium over and above that required for complexing purposes. In some cases the dissolving of the cuprous salt may be hastened by heating the mixture, by bubbling in air or oxygen, or a combination thereof. In order to effectively use all of the copper, enough amine should be added to complex and thereby dissolve all of the added cuprous salt. Larger excesses of amine may be desirable in order to completely dissolve all of the diamino compound and to act as a solvent for the reaction product. The concentration of the catalyst system is not critical, it being only necessary to use an effective concentration which can be readily determined by persons skilled in the art and from the examples which follow.

Among the solvents which can be employed in my process may be mentioned, e.g., alcohols, ketones, hydrocarbons, chlorohydrocarbons, nitrohydrocarbons, ethers, esters, amides, mixed etheresters, sulfoxides, etc., providing they do not interfere or enter into the oxidation reaction. Included among such solvents may be mentioned, for instance, ethanol, isopropanol, acetone, anisole, benzene, toluene, trichloroethylene, dichlorobenzene, nitrobenzene, ethyl acetate, dimethyl acetamide, dimethyl sulfoxide, etc. The amount of solvent can be varied widely, e.g., from 0.5 to 100 parts, by weight, solvent per part diamino compound, calculated on a weight basis.

Oxygen or an oxygen-containing gas is bubbled into the reaction mixture causing an exothermic reaction to take place. Ordinarily the reaction is advantageously prefaced by sweeping the reaction mixture with an inert gas, by carrying out the reaction at sub-atmospheric pressures, by the use of open reaction vessels, by heat, or any combination thereof. In carrying out my reaction, the oxygen can be diluted with an inert gas such as nitrogen, helium, argon, etc., or air itself can be used.

Since the reaction is usually exothermic, precaution should be taken to prevent the reaction from becoming overheated. Generally, the oxidation reaction is initiated at as low a temperature as the reaction will start, as evidenced by the reaction becoming exothermic. Usually, I control the oxidation reaction so that the maximum temperature does not exceed 75° C. to 100° C., and preferably does not exceed 50° C. The heat of reaction may be removed, for example, by radiation, convection, or by cooling coils which can either be immersed in, or surround the reaction vessel.

Ordinarily, I continue the passage of oxygen into the reaction mixture until no more heat is generated, or the desired amount of oxygen is absorbed. To terminate the reaction, the catalyst system can be destroyed by addition of a dilute acid, preferably a dilute mineral acid, such as hydrochloric or sulfuric acid, which reacts with the tertiary amine and cuprous salt. Precipitation of the desired quinone product can be accomplished by combining the reaction product with water containing an acid, preferably a mineral acid.

It should be recognized that the oxidation of the diaminotetraalkyl benzene does not directly proceed to the quinone but rather is believed to proceed through an intermediate composition, namely, a diimine, of the starting diaminotetraalkyl benzene. Thus, for instance, the oxidation of tetraalkyldiamine in the course of my process will yield the diimine having the generic formula

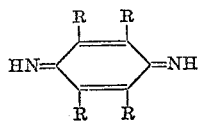

and the specific composition

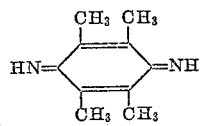

where the starting material is durenediamine. The diimine is somewhat unstable but in solution is readily converted to the quinone by treatment of the former with an aqueous solution of a mineral acid, e.g., hydrochloric acid, sulfuric acid, phosphoric acid, etc. The acid concentration is not critical since this is merely a hydrolysis reaction well known in the art. Enough water should be used to precipitate the quinone from the solvent medium. On a weight basis, for each part solvent in the reaction mixture, I may employ from 1 to 50 parts or more of water.

The concentration of acid in the water is also not critical, but should be sufficient to convert the imine intermediate compound to the final quinone structure. In determining the amount of acid used, consideration should be given to the amount of acid which may react with the catalyst system. Thus, under most conditions, I can employ water for precipitating the desired quinone, containing from about 1 to 10 percent or more, by weight, thereof of the mineral acid. The solid material which ordinarily deposits as a result of this acid treatment of the diimine is readily removed by filtration and can be re-crystallized from a suitable solvent to give relatively high yields of from 75 percent or higher, of the desired quinone.

In order that those skilled in the art may better understand how my invention may be practiced, the following examples are given by way of illustration and not by way of limitation. All parts are by weight.

*Example 1*

To a wide mouth flask set in a water bath maintained at a temperature of about 30° C., the flask being equipped with an oxygen inlet and a stirrer, were added 106.5 parts isopropanol, 1 part cuprous chloride, 1.2 parts N,N,N',N'-tetramethylethylenediamine, and 20 parts durenediamine. Oxygen was passed through the stirred solution for about 2 hours. The reaction mixture was then added to about 410 parts water containing about 30 parts of 37.1% hydrochloric acid. A bright yellow solid deposited which was removed by filtration. After recrystallization from n-heptane, there was obtained 17.5 parts duroquinone (in a yield of about 87.4%) having a melting point of 111.5° C. to 112.5° C. Analysis of this compound established it was duroquinone by the following results C=73.1%; H=7.4%; theoretical C=73.14%; H=7.37%.

*Example 2*

About 246 parts of pyridine (used both as source of tertiary amine and as solvent) and 2 parts cuprous chloride were added to a wide mouth flask, set in a water bath maintained at a temperature of about 30° C. The flask was equipped with a stirrer, oxygen inlet and thermometer. While oxygen was passed through the vigorously stirred solution, 50 parts of durenediamine was added. The passage of oxygen through the durenediamine solution was continued for about 75 minutes at the end of which time the reaction mixture was diluted with about 400 parts water containing approximately 30 parts concentrated hydrochloric acid (37.1% HCl). Fine yellow needles of duroquinone settled out from the solution. After the needles were filtered off, they were recrystallized from ethanol to yield about 35.2 parts of essentially pure duroquinone.

It will of course be apparent to those skilled in the art that in addition to the specific diaminotetraalkylbenzene employed in the foregoing examples, other diaminotetraalkylbenzenes in which the alkyl groups vary can be employed without departing from the scope of the invention. Obviously, other tertiary amines and cuprous salts may be employed in place of those used in the foregoing examples. Furthermore, the proportions of the amine and cuprous salt can be varied consistent with there being present sufficient amounts of each for complexing purposes (thus requiring the desired molar ratios of each) and any excess of amine which may be used as the solvent medium. In addition, the conditions under which the oxidation reaction takes place may be varied within wide limits and advantageously within those conditions described previously.

The compositions obtained in accordance with the practice of the present invention have many uses. Thus, the duroquinone obtained can be employed as an oxidation inhibitor for various resins including vinyl halide resins, cellulose acetate, etc. Furthermore, the quinone compositions can be readily reduced with hydrogen to hydroquinones (as shown, for instance, in Canadian Patent 392,259) to give hydroquinones of the formula

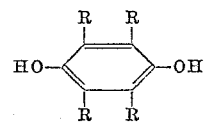

having two nuclearly bonded hydroxyl groups as well as four alkyl radicals. Such compositions can be reacted with dicarboxylic acids, for instance, terephthalic acid or anhydride or the acid chloride, isophthalic acid or anhydride or the acid chloride, adipic acid, etc., to make aromatic polyesters having good heat stability despite the fact that these compositions are thermoplastic. Examples of aromatic polyesters which can be made from dihydroxy benzene derivatives of quinone may be found in the copending applications of Simon W. Kantor and Fred F. Holub, Serial Nos. 33,124–127, 33,130 and 33,131, all filed June 1, 1960, and assigned to the same assignee as the present invention.

What I claim as new and desire to secure by Letters Patent of the United States is:

1. The process for making a tetraalkyl-1,4 benzoquinone in which each of the alkyl groups contains from 1 to 4 carbon atoms which comprises subjecting a precursor of said quinone having the formula

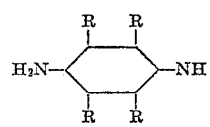

to oxygen in the presence of (*a*) a tertiary amine free of an aryl substituent on the nitrogen atom and being selected from the class consisting of (1) tertiary acyclic aliphatic amines free of ring-bonded nitrogen, (2) tertiary cyclic amines in which the nitrogen is part of the ring structure and (3) tertiary aliphatic polyamines, and (*b*) a cuprous salt capable of existing in the cupric state and capable of forming a complex with the tertiary amine, where R in the above formula is a lower alkyl radical of from 1 to 4 carbon atoms.

2. The process for making duroquinone which comprises subjecting durenediamine to oxygen in the presence of (*a*) a tertiary amine free of an aryl substituent on the nitrogen atom and being selected from the class consisting of (1) tertiary acyclic aliphatic amines free of ring-bonded nitrogen, (2) tertiary cyclic amines in which the nitrogen is part of the ring structure and (3) tertiary aliphatic polyamines, and (*b*) a cuprous salt capable of existing in the cupric state and capable of forming a complex with the tertiary amine.

3. The process for making duroquinone which comprises passing oxygen through a solution of durenediamine in the presence of (a) a tertiary amine free of an aryl substituent on the nitrogen atom and being selected from the class consisting of (1) tertiary acyclic aliphatic amines free of ring-bonded nitrogen, (2) tertiary cyclic amines in which the nitrogen is part of the ring structure and (3) tertiary aliphatic polyamines, and (b) a cuprous salt capable of existing in the cupric state and capable of forming a complex with the tertiary amine, and while the reaction product derived from passage of the oxygen is still in the dissolved state, mixing said reaction product with an aqueous solution of a mineral acid and thereafter isolating duroquinone.

4. The process as in claim 2 in which the cuprous salt is cuprous chloride and the tertiary amine is N,N,N',N'-tetramethylethylenediamine.

5. The process as in claim 2 in which the cuprous salt is cuprous chloride and the tertiary amine is pyridine.

6. The process of making duroquinone which comprises passing oxygen through an alcohol solution of durenediamine in the presence of a catalyst system composed of cuprous chloride and N,N,N'N'-tetramethylethylenediamine, treating the solution of the reaction product obtained by the passage of oxygen with an aqueous solution of a mineral acid to convert the durenediimine in said solution to duroquinone, and thereafter isolating the formed duroquinone.

References Cited in the file of this patent

UNITED STATES PATENTS

| | | |
|---|---|---|
| 2,135,366 | Tinker et al. | Nov. 1, 1938 |
| 2,295,446 | Behnisch | Sept. 8, 1942 |
| 2,399,355 | Klein | Apr. 30, 1946 |

OTHER REFERENCES

Noller: "Chemistry of Organic Compounds," 2nd edition, pages 520–1 (1957) (Saunders).